United States Patent [19]

Hoppie

[11] 4,319,655
[45] Mar. 16, 1982

[54] REGENERATIVE BRAKING DEVICE WITH ROTATIONALLY MOUNTED ENERGY STORAGE MEANS

[75] Inventor: Lyle O. Hoppie, Birmingham, Mich.

[73] Assignee: Eaton Corporation, Cleveland, Ohio

[21] Appl. No.: 102,696

[22] Filed: Dec. 12, 1979

[51] Int. Cl.³ .............................................. B60K 25/00
[52] U.S. Cl. .................................... 180/165; 185/11; 185/40 H
[58] Field of Search ............................ 180/165, 54 R; 185/40 H, 41 R, 9, 10, 11, 12, DIG. 1; 192/4 A

[56] References Cited

U.S. PATENT DOCUMENTS

| | | | |
|---|---|---|---|
| 695,430 | 3/1902 | Haas | 185/41 R |
| 1,030,051 | 6/1912 | Brundege | 185/41 R |
| 2,137,574 | 11/1938 | Kromer | 180/165 |
| 3,126,070 | 3/1964 | Hayek | 185/37 |
| 3,641,843 | 2/1972 | Lemmens | 180/165 X |
| 3,945,453 | 3/1976 | Black | 180/54 R |
| 4,159,042 | 6/1979 | Jayner | 180/54 R |

FOREIGN PATENT DOCUMENTS 845752  9/1939  France ................................. 185/12

Primary Examiner—Joseph F. Peters, Jr.
Assistant Examiner—Milton L. Smith
Attorney, Agent, or Firm—C. H. Grace; P. S. Rulon

[57] ABSTRACT

A regenerative braking device for an automotive vehicle includes an energy storage assembly (12) having a plurality of rubber rollers (26, 28) mounted for rotation between an input shaft (30) and an output shaft (32), clutches (50, 56) and brakes (52, 58) associated with each shaft, and a continuously variable transmission (22) connectable to a vehicle drivetrain and to the input and output shafts by the respective clutches. In a second embodiment the clutches and brakes are dispensed with and the variable ratio transmission is connected directly across the input and output shafts. In both embodiments the rubber rollers are torsionally stressed to accumulate energy from the vehicle when the input shaft rotates faster or relative to the output shaft and are torsionally relaxed to deliver energy to the vehicle when the output shaft rotates faster or relative to the input shaft.

3 Claims, 2 Drawing Figures

REGENERATIVE BRAKING DEVICE WITH ROTATIONALLY MOUNTED ENERGY STORAGE MEANS

CROSS-REFERENCE TO RELATED APPLICATIONS

This application is related to co-pending U.S. patent application Ser. No. 944,442, filed Sept. 21, 1978, U.S. patent application Ser. No. 095,901, filed Nov. 19, 1979, and U.S. patent application Ser. No. 100,783, filed Dec. 5, 1979.

These applications are assigned to the assignee of this application and they are incorporated herein by reference.

FIELD OF THE INVENTION

The invention relates to regenerative braking and more specifically to regenerative braking of an automotive vehicle.

BACKGROUND OF THE INVENTION

Automotive regenerative braking devices having energy storage assemblies employing metal springs are well-known. In general such devices have been manually operated to effect vehicle braking by converting vehicle motion (kinetic energy) into resiliently stored potential energy and manually operated to effect vehicle acceleration with the stored energy. The storage assemblies employing metal springs have been unduly bulky and/or heavy. Further, the amount of braking and driving torque provided by such assemblies has not been readily controllable.

In a co-pending U.S. patent application, Ser. No. 944,442, filed Sept. 21, 1978 and now U.S. Pat. No. 4,246,988, applicant discloses a regenerative braking system having a control system for modulating braking and driving torques provided by a storage assembly having torsionally stressed rubber rollers which are fixed at one end against rotation. While this control system is an effective way to control braking and acceleration torques, it has the disadvantage of requiring rapid on/off control of clutches and brakes under relatively high torque loads and substantial rotational speed differences.

SUMMARY OF THE INVENTION

An object of this invention is to provide a regenerative braking device wherein braking and driving torques provided by the device are controlled without the need of rapid on/off control clutches and brakes.

According to a feature of the invention, the regenerative braking device includes input and output driveshafts mounted for rotation, means selectively operative to drivingly connect the shafts with a drivetrain of a vehicle, and a resilient means fixed at opposite ends to the input and output shafts for rotationally supporting the resilient means and for stressing and relaxing the resilient means in response to the selectively operative means connecting the input and output shafts respectively with the drivetrain.

BRIEF DESCRIPTION OF THE DRAWING

The embodiments of the invention are shown in the accompanying drawing in which.

Figure 1:
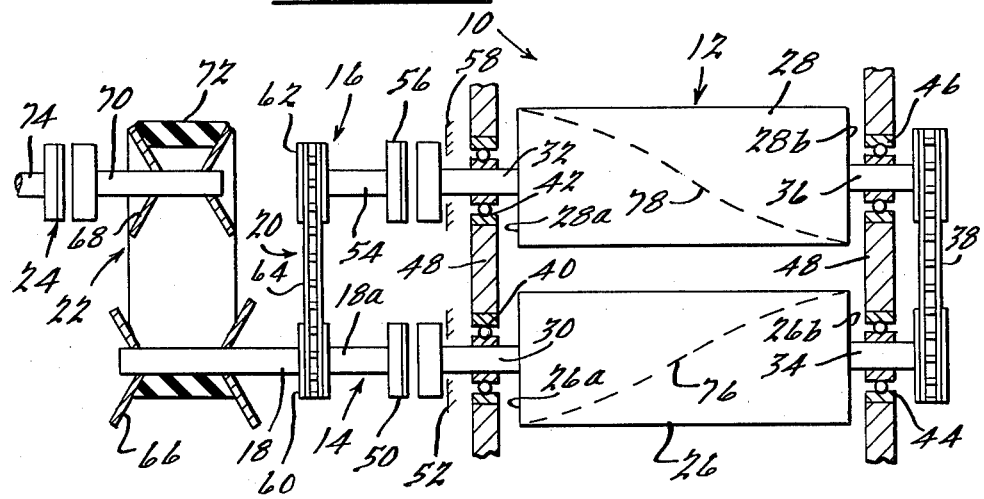
FIG. 1 schematically illustrates a regenerative braking device having a transmission for controlling the rate of energy flow, and clutches and brakes for turning the energy flow on and off.

Certain terminology referring to the proposed use of the regenerative braking device in an automotive vehicle and motion and location of components of the device in the drawing will be used in the following description. This terminology is for convenience in describing the disclosed embodiment and shall not be considered limiting unless explicitly used in the appended claims.

DETAILED DESCRIPTION OF THE DRAWING

FIG. 1 schematically illustrates a regenerative braking device 10 including an energy storage assembly 12, an energy input assembly 14 and an energy output assembly 16 for selectively connecting the storage assembly with a driveshaft or common power path 18 connected to assemblies 14 and 16 by a chain drive assembly 20, a continuously variable transmission 22, and an input/output clutch assembly 24.

Energy storage assembly 12 includes a plurality of elastic bars or elastomeric rollers 26 and 28, an input shaft 30 fixed to an input end 26a of roller 26, an output shaft 32 fixed to an output end 28a of roller 28, an intermediate or output shaft 34 fixed to an output end 26b of roller 26, an intermediate or input shaft 36 fixed to an input end 28b of roller 28, a continuous chain or belt 38 which drivingly interconnects shafts 34 and 36 in a one-to-one speed ratio, and bearings 40, 42, 44, and 46 which mount the shafts for rotation. Bearings 40–46 are supported by a partially shown housing 48.

Input assembly 14, which defines an input power path to the energy storage assembly, includes a shaft portion 18a defined by an extension of the drive shaft 18, an input clutch 50, and an input brake 52. Clutch 50 is applied to drivingly interconnect shafts 30 and 18 and brake 52 is applied to prevent rotation of shaft 30 and end portion 26a of roller 26. During vehicle braking, clutch 50 is applied and brake 52 is released.

Output assembly 16, which defines an output power path for the energy storage asssembly, includes a shaft 54 in constant driving relation with driveshaft 18 and shaft portion 18a by drive assembly 20, an output clutch 56, and an output brake 58. Clutch 56 is applied to drivingly interconnect shafts 32 and 54, and brake 58 is applied to prevent rotation of shaft 32 and end portion 28a of roller 28. During vehicle acceleration clutch 56 is applied, and brake 58 is released. Further, when input clutch 50 is applied, output clutch 56 is released and output brake 58 is applied; when output clutch 56 is applied, input clutch 50 is released and input brake 52 is applied.

Drive assembly 20 includes chain drive sprockets 60 and 62 fixed to shafts 18 and 54, respectively, and a continuous chain 64. It should be clear that drive assembly 20 can be replaced by any of several well-known devices to drivingly interconnect shafts 18 and 54, e.g., a V-belt, gears, etc.

Variable ratio transmission 22 includes a variable diameter sheave or pulley 66 fixed for rotation with shaft 18, a variable diameter sheave or pulley 68 fixed for rotation with a shaft 70, and a continuous V-belt 72. The diameters of pulleys 66 and 68 are readily varied by moving one or both of the halves of one pulley together while separating the halves of the other pulley. Transmission 22 is a well-known species of transmissions which are known as continuously variable transmissions. Transmission 22 may be any one of the several types of continuously variable transmissions or it may be a discrete or step ratio type transmission.

Clutch 24 may be a conventional friction clutch connected on one side to a partially shown shaft 74 which is drivingly connected to an unshown drivetrain of a motor vehicle or any machine having a mass to be braked and accelerated. The other side of the clutch is connected directly to pulley 68 by shaft 70. Clutch 24 may be dispensed with and shaft 70 may be continuously driven by the vehicle drivetrain. However, to minimize losses and wear of the transmission, clutch 24 is preferred. Clutch 24 may be unapplied during steady state vehicle operation and applied in response to initiation of vehicle braking or acceleration.

Looking now at the operation of device 10, shaft 74, when viewed from the left in the drawing, rotates clockwise when the vehicle is moving. During steady state operation of the vehicle, clutches 24, 50, and 56 are unapplied or released and brakes 52 and 58 are applied. Hence, device 10 is disconnected from the vehicle drivetrain by clutch 24; input and output power paths 14 and 16 are disconnected by clutches 50 and 56; and any energy in the storage assembly is locked therein by brakes 52 and 58. During vehicle braking, output clutch 56 and output brake 58 remain in their steady state positions while clutches 24 and 52 are applied and input brake 52 is released, thereby effecting a driving connection for shaft 74 into the storage assembly via clutch 24, shaft 70, transmission 22, shaft 18, clutch 50, and shaft 30. This driving connection rotates shaft 30 clockwise to effect a flow of energy into the storage assembly from the vehicle drivetrain at a rate determined by the rotational speed of shaft 74 and the speed ratio of transmission 22. The clockwise rotation of shaft 30 twists or torsionally stresses rubber rollers 26 and 28 as depicted by phantom lines 76 and 78. As the torsional stress increases, the storage assembly accumulates energy from the vehicle drivetrain, thereby slowing or braking the vehicle. The braking rate and the flow of energy from the drivetrain to the energy storage assembly is decreased by decreasing the diameter of pulley 68 relative to pulley 66. Conversely, the braking rate and flow of energy from the drivetrain is increased by increasing the diameter of pulley 68 relative to pulley 66. The torsional stress in the rollers applies a counterclockwise torque to shaft 30 and a clockwise torque to shaft 32.

During vehicle acceleration, clutch 50 and brake 52 remain in their steady state positions while clutches 24 and 56 are applied and brake 58 is released, thereby effecting a driving connection from the storage assembly to shaft 74 via shaft 32, clutch 56, shaft 54, chain drive assembly 20, shaft 18, transmission 22, shaft 70, and clutch 24. This driving connection rotates shaft 32 clockwise to effect a flow of energy back into the vehicle drivetrain from the energy storage assembly at a rate determined by the rotational speed of shaft 74 and the speed ratio of transmission 22. The clockwise rotation of shaft 32 relaxes the torsional stress in the rubber rollers to effect a delivery of accumulated energy back to the vehicle drivetrain, thereby accelerating or driving the vehicle. The acceleration and the flow of energy from the storage assembly is decreased by increasing the diameter of pulley 66 relative to pulley 68. Conversely, the acceleration and the flow of energy from the storage assembly is increased by decreasing the diameter of pulley 66 relative to pulley 68.

From the foregoing, it should be clear that, the rate of energy flow into and from the energy storage assembly is readily controlled by varying the speed ratio of transmission 22. The speed ratio of transmission 22 may also be used to minimize or decrease impulse forces acting on components of the regenerative braking device and the vehicle drivetrain as a deceleration or an acceleration is initiated, thereby decreasing destructive wear and tear of these components. For example, when the vehicle is operating in a steady state mode, clutch 24 can be released as previously described, and clutches 50 and 56 can both be applied while brakes 52 and 58 are both released, thereby effecting a balanced force loop defined by energy storage assembly 12, input and output power paths 14 and 16, and chain drive assembly 20. This in effect leaves the components of the balanced force loop and the transmission in a free wheeling state regardless of the speed ratio of the transmission. Hence, if pulley 66 is as large as it can be relative to pulley 68, when clutch 24 is applied, a relatively low transient torque will bring the transmission and the components of the balanced force loop up to speed. If clutch 56 is then released and brake 58 applied with pulleys 66 and 68 in the same positions, deceleration at the minimum rate will result. Thereafter deceleration can be increased as desired by increasing the diameter of pulley 68 relative to pulley 66.

Figure 2:
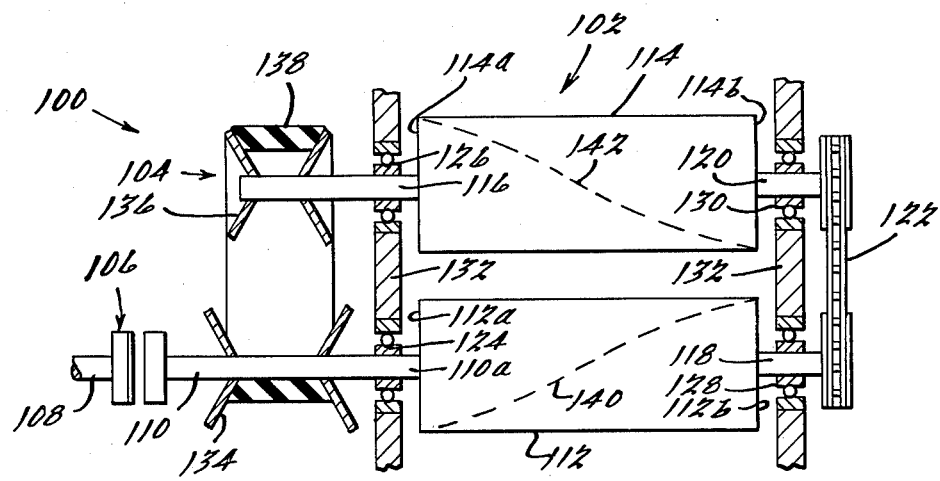
FIG. 2 schematically illustrates a regenerative braking device having a transmission for controlling the rate of energy flow and for turning the energy flow on and off.

Referring now to FIG. 2, therein is shown a regenerative braking device 100 including an energy storage assembly 102, a variable ratio transmission 104, and an input/output clutch 106. Clutch 106 may be a conventional friction clutch connected on one side to a partially shown shaft 108 which is drivingly connected to an unshown drivetrain of a vehicle or a mass having kinetic energy. The other side of clutch 106 is connected directly to a driveshaft or common power path 110.

Energy storage 102 includes a plurality of elastic bars or elastomeric rollers 112 and 114, an input shaft 110a defined by an extension of shaft 110 and fixed to an input end 112a of roller 112, an output shaft 116 fixed to an output end 114a of roller 114, an intermediate or output shaft 118 fixed to an output end 112b of roller 112, an intermediate or input shaft 120 fixed to an input end 114b of roller 114, a continuous chain or belt 122 which drivingly interconnects shafts 118 and 120 in a one-to-one speed ratio, and bearings 124, 126, 128, 130 which mount the shafts for rotation. Bearings 124–130 are supported by a partially shown housing 132. Rollers 112 and 114 are shown connected in series between input and output shafts 110a and 116; however, it should be clear that the rollers can be connected in parallel. The rollers are twisted or torsionally stressed to accumulate energy when input shaft 110a rotates faster than or relative to output shaft 116. When output shaft 116 rotates faster than or relative to input shaft 110a, the rollers are unstressed or relaxed to deliver accumulated energy. It should be clear that other types of energy storage means may be used in lieu of the rubber rollers and that the other types may be stressed differently.

Variable ratio transmission 104 includes variable diameter sheaves or pulleys 134 and 136 fixed for rotation with their respective shafts 110 and 116, and a continuous V-belt 138. Transmission 104 is a well-known species of transmissions which are known as continuously variable transmissions. Transmission 104 may be any of several types of continuously variable transmissions or a step ratio transmission. The diameters of pulleys 134 and 136 are readily varied by moving one or both of the halves of one pulley together while separating the halves of the other pulley. When the pulley diameters are the same and clutch 106 is applied, no energy flows to or from shaft 108.

During steady state operation of the vehicle, clutch 106 is preferably unapplied and pulleys 134 and 136 are positioned to have equal diameters so that clutch 106 may be applied without load when a vehicle braking or acceleration mode is initiated. When a deceleration mode is initiated, clutch 106 is applied and the diameter of pulley 134 is made smaller than the diameter of pulley 136, whereby input shaft 110a rotates faster than output shaft 116. This difference in speed of the input and output shafts torsionally stresses or twists the rollers (see phantom lines 140 and 142) to effect a delivery of energy from the vehicle drivetrain to the energy storage assembly, thereby slowing or braking the vehicle as energy is accumulated in the storage assembly. For a given rotational speed of shaft 108 deceleration of the vehicle may be increased by further decreasing the diameter of pulley 134 with respect to pulley 136 and deceleration may be decreased by bringing the diameters closer to a one-to-one ratio. When acceleration of the vehicle is desired, clutch 106 is applied and the diameter of pulley 136 is made smaller than the diameter of pulley 134, whereby output shaft 116 rotates faster than input shaft 110a. This difference in speed of the input and output shafts torsionally relaxes the rollers to effect a delivery of accumulated energy back to the vehicle drivetrain, thereby accelerating or powering the vehicle. For a given rotational speed of shaft 108, accleration of the vehicle may be increased by further decreasing the diameter of pulley 136 with respect to pulley 134 and acceleration may be decreased by bringing the diameters closer to a one-to-one ratio.

Thinking now in terms of power rather than just energy, regenerative braking device 100 is a power splitting energy transfer device which can circulate energy from the storage assembly output at shaft 116 back to the storage assembly input at shaft 110a. More specifically, since torque is uniform throughout the energy storage assembly, the torques on shafts 110a and 116 are the same. Hence, the ratio of power flowing into the energy storage assembly along shaft 110a and out of the energy storage assembly along shaft 116 is equal to the speed ratio of the shafts. For example, when the input shaft rotates four times faster than the output shaft, a four-to-one ratio, three units of power flow from shaft 108 into input shaft 110a and one unit of power flows from output shaft 116 into input 110a via transmission 104. Hence, during vehicle deceleration transmission 104 never carries more than a fraction of the power being absorbed by the energy storage assembly.

Two embodiments of the invention have been disclosed for illustrative purposes. Many variations and modifications of the embodiments are believed to be within the spirit of the invention. The following claims are intended to cover the inventive portions of the embodiments and the variations and modifications within the spirit of the invention.

What is claimed is:

1. A regenerative braking device for accumulating energy from a vehicle drivetrain to brake the vehicle and for delivering the accumulated energy to the drivetrain to accelerate the vehicle, said device comprising:
   input and output driveshafts;
   means mounting said shafts for rotation;
   an input clutch and an output clutch respectively operative when applied to drivingly connect said input shaft and said output shaft with the drivetrain;
   an input brake and an output brake respectively operative when applied to prevent rotation of said input and output driveshafts; and
   elastomeric roller means having an input end fixed to said input shaft and an output end fixed to said output shaft for rotationally supporting said roller means, said roller means torsionally stressed to accumulate energy from the drivetrain when said input clutch and output brake are applied, and said roller means torsionally relaxed to deliver accumulated energy to the drivetain when said output clutch and input brake are applied.

2. The device of claim 1, further including:
   a variable ratio transmission having a driveshaft adapted for driving connection with said drivetrain and another driveshaft connectable with said input and output driveshafts by said input and output clutches.

3. The device of claim 2, wherein said transmission is a continuously variable transmission.

* * * * *

UNITED STATES PATENT AND TRADEMARK OFFICE
CERTIFICATE OF CORRECTION

PATENT NO. : 4,319,655

DATED : March 16, 1982

INVENTOR(S) : Lyle O. Hoppie

It is certified that error appears in the above-identified patent and that said Letters Patent is hereby corrected as shown below:

Column 1, line 17, before the heading Field of The Invention, insert:

-- The Government has rights in this invention pursuant to Subcontract No. 2617509 under Contract No. W-7405-ENG-48, awarded by the U.S. Department of Energy --.

Signed and Sealed this

First Day of March 1983

[SEAL]

Attest:

GERALD J. MOSSINGHOFF

Attesting Officer

Commissioner of Patents and Trademarks